Patented May 18, 1954

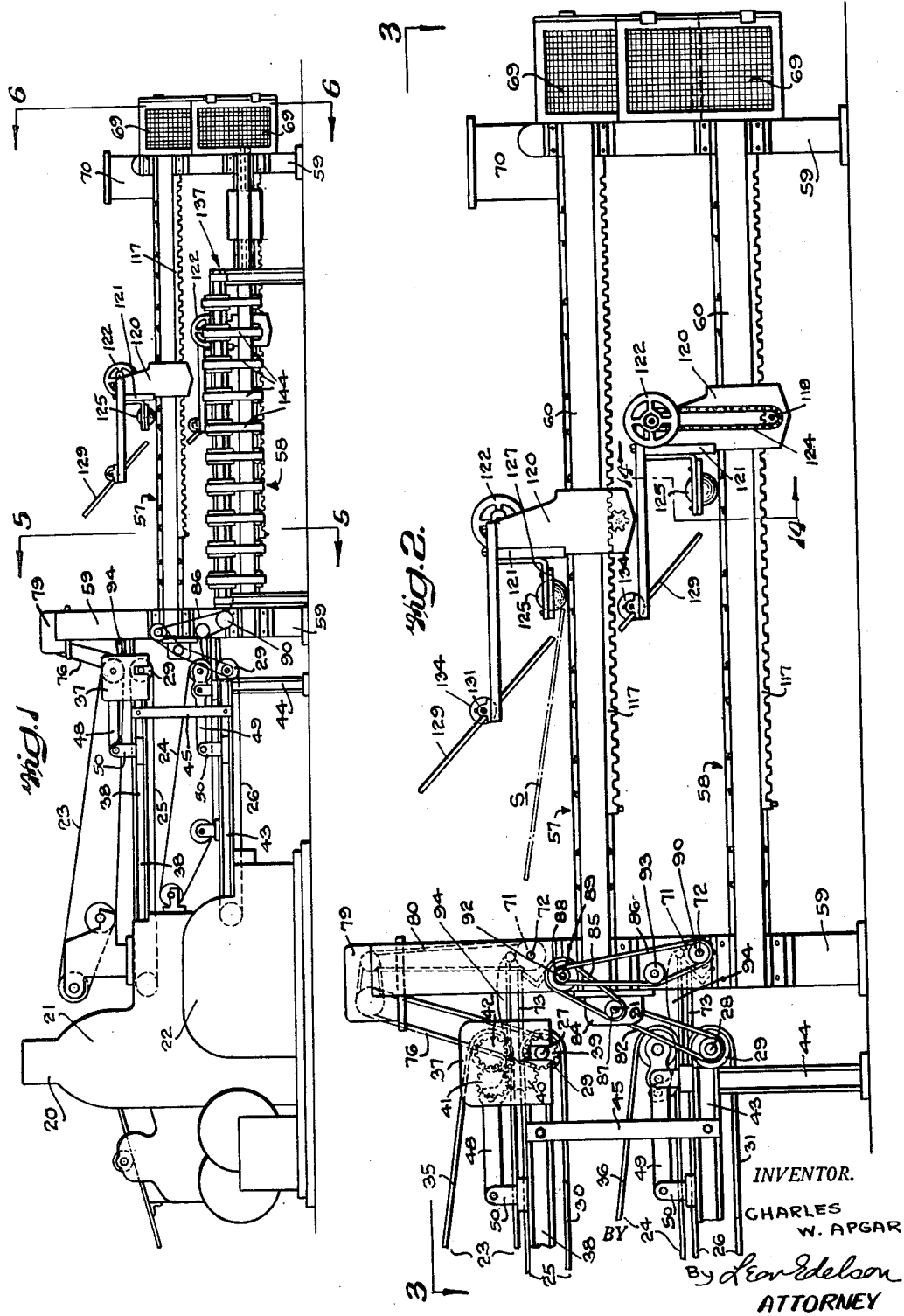

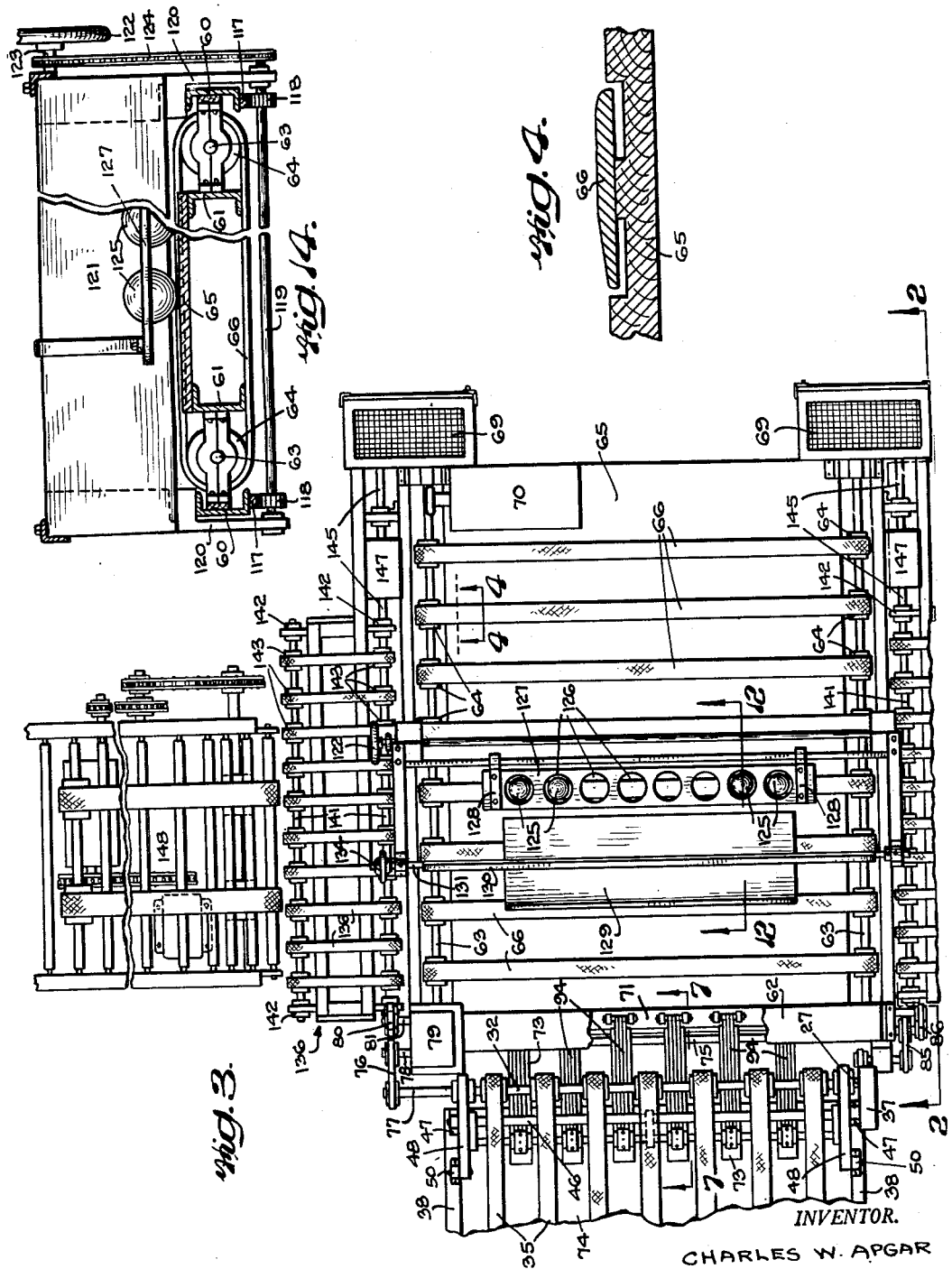

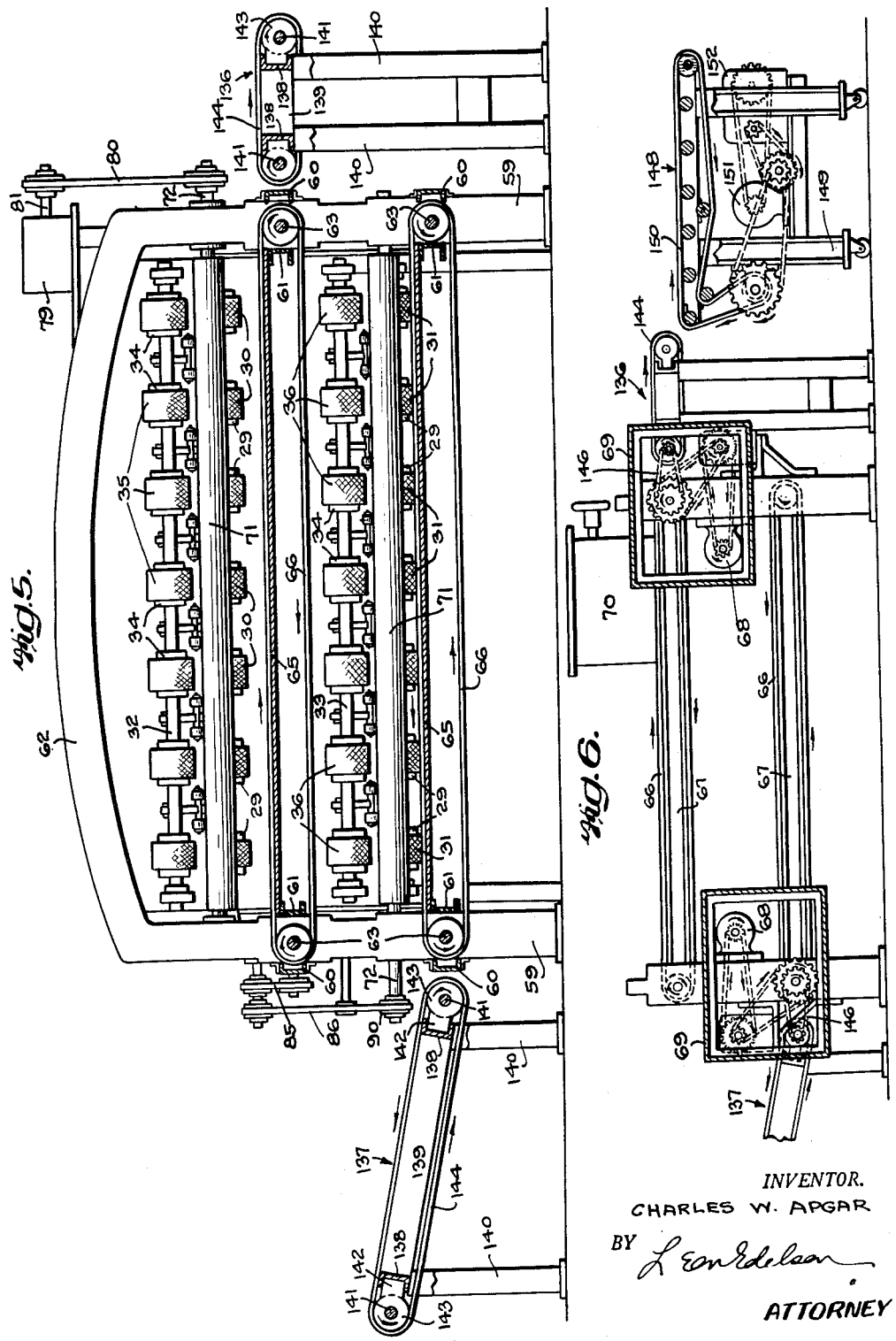

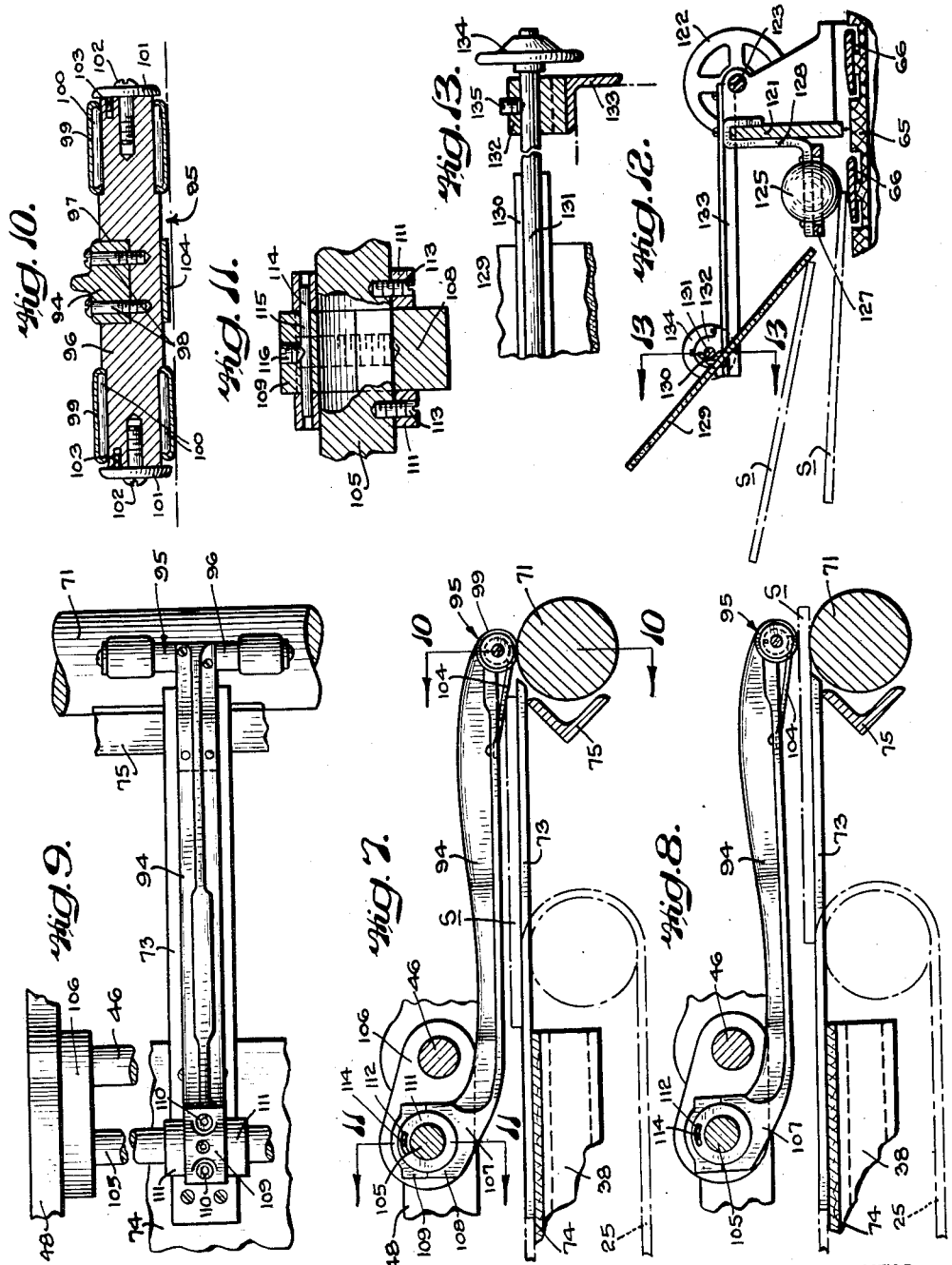

2,678,716

UNITED STATES PATENT OFFICE 2,678,716

STOCK TAKE-OFF APPARATUS

Charles W. Apgar, Philadelphia, Pa., assignor to Abraham L. Rosenfeld, Charles W. Apgar, and Frederic R. Mann, Philadelphia, Pa., trustees Application December 29, 1948, Serial No. 68,017

4 Claims. (Cl. 198—35)

This invention relates generally to apparatus for handling sheet material of the type which is manufactured in the form of a continuous web of stock adapted to have any desired lengths or sections thereof cut or severed either into the form of single-cut sheets of web width or into the form of multiple-cut sheets, each sheet of which is less than web width, and more particularly to an improved apparatus which is particularly adapted to facilitate the delivery, distribution and stacking of such sheets in either form with a minimum of manual handling thereof.

Apparatus of this general type is shown and described in the pending applications of Charles W. Apgar, Serial No. 554,092 filed September 14, 1944, now Patent No. 2,498,061, and Serial No. 575,314 filed January 30, 1945, now Patent No. 2,485,952, including means for discharging or transferring cut sheets from the main discharge conveyor of the machine manufacturing the same and a stock take-off conveyor adapted to automatically receive the cut sheets, stop the same in their course of travel, change their direction of travel and deliver them to stations where they may be conveniently handled and stacked. The apparatus of the present invention provides improved means for controlling the delivery speed of the sheets, either in single or multiple-cut form, as they are transferred from the main discharge conveyor; provides an improved stock take-off conveyor mechanism having an independent drive for controlling the speed thereof and having novel means for stopping the forward motion of the said sheets; and provides an auxiliary or secondary stock take-off conveyor mechanism designed for association with the first named or primary stock take-off conveyor mechanism to automatically receive and remove sheets therefrom to facilitate handling thereof.

In the operation of the present apparatus and in the apparatus disclosed in the said Apgar applications, it is desirable that the forward motion of the sheets as delivered from that part of the machine by which they are cut to predetermined size or otherwise processed be at certain desired speeds to facilitate stacking of the sheets. In application Serial No. 554,092, in one form the sheets are discharged from the main conveyor mechanism of the machine cutting the same at the full speed thereof to be stopped by a back-board on the stock take-off apparatus associated with the main conveyor. In another form in said application and in application Serial No. 575,314 the forward motion of the sheets is reduced by stock transferring means associated with the main discharge conveyor so that they are delivered therefrom with practically no forward motion. The speed of the forward motion of the sheets as above described is generally satisfactory for single-cut sheets formed of sections of any desired length cut transversely of the continuous web stock but is not satisfactory for multiple-cut sheets also formed of sections of any desired length cut transversely of the web stock but which are additionally cut or slotted lengthwise. Such multiple-cut sheets, which comprises a plurality of closely adjacent like sheets the combined width of which is substantially equal to the web stock width, should have a forward motion of a speed greater than that of the main discharge conveyor to facilitate stacking thereof on an associated primary stock take-off conveyor.

Accordingly the present invention has for one of its objects to provide an improved arrangement of the so-called stock transfer means in association with the main discharge conveyor whereby the forward motion of sheets may be regulated to any desired linear speed in relation to that of the main discharge conveyor and which may be employed effectively in association with a stock take-off apparatus or independently thereof, in which latter case the stock transfer means of the present invention may be arranged for operative association with the main delivery conveyor of any sheet processing apparatus, such as one in which the sheets are cut to predetermined size or in which sheets of predetermined size are slotted and scored or surface printed.

Generally the stock take-off apparatus of the said applications are designed, after automatically receiving the sheets successively as delivered with slowed down forward motion by the stock transfer means or as delivered directly from the main discharge conveyor at the speed thereof against a motion arresting back-board, to then automatically shift the sheets laterally of their original course of travel thereby conveying them along a new course of travel for delivery in overlapped or "fanned" relation to a station where they may be conveniently handled and stacked. Thus, in the apparatus of the prior applications, when the stock is in the form of single-cut sheets and these are delivered to the lateral take-off conveyor successively, the degree of overlap between successive sheets may be readily changed as desired or required simply by adjusting the variable drive connection provided for this purpose between the commonly driven main delivery conveyor and the lateral take-off conveyor associated therewith, to change the speed of the latter. However, when the stock is in the form of multiple-cut sheets required to be separately stacked upon the lateral take-off conveyor, the overlapping between such multiple-cut sheets successively received upon the lateral take-off conveyor, however adjusted to any degree within the limits of the said variable drive connection above referred to, would result in undesirable interleaving between sheets of the separate stacks, in consequence of which removal of a stack of sheets would become a manually difficult task.

In order to facilitate the manual handling of the stacked piles of the multiple-cut sheets, the latter should be received by the lateral stock take-off conveyor apparatus at a speed greater than that imparted to them by the main discharge conveyor alone and the speed of travel of the lateral conveyor in relation to the speed of travel of the multiple-cut sheets should be greater than that obtainable by means of the aforesaid variable drive connection between the commonly driven main delivery conveyor and the lateral stock take-off conveyor associated therewith. Accordingly, it is also an object of the invention to provide a variable speed stock transferring means which is capable of imparting to the laterally transferred sheets a linear speed so related to that of the main discharge conveyor as to insure stacking of the sheets upon the lateral transfer conveyor in separate piles with no interleaving between the sheets of the separate piles.

The present invention also has for another of its objects an improved lateral stock take-off conveyor having means for automatically receiving either single-cut sheets at one speed or multiple-cut sheets at an increased speed and for arresting the forward motion thereof upon discharge from the main delivery, the take-off conveyor being designed, in the case of single cut sheets delivered thereto, to effect their transfer in overlapped relation, while in the case of multiple-cut sheets to effect their transfer in the form of uniformly stacked separate piles, the sheets in either form being thus shifted laterally of their original course of travel to a station where they may be conveniently handled and stacked. This improved means includes drive means for operating the lateral take-off conveyer independent of the drive means operating the main discharge conveyor whereby the speed of the lateral conveyor may be so regulated to cause successive single-cut sheets to be received in overlapped stacked relation or to cause individual sheets of successive multiple-cut sheets to be received in evenly stacked piles. The mechanism for arresting the forward motion of the sheets in their course is improved to provide means, preferably in the form of weighted universally rotatable ball members, to effectively arrest the sheets adjacent a back-board while freely permitting movement thereof laterally from such arrested position all without marring or defacing the sheets or the edges thereof, said mechanism desirably including a deflector to guide occasionally warped sheets under the ball members.

As explained in the said pending applications, the manufacture of corrugated paper board is often conducted upon two levels of a dual-level apparatus so that the single or the multiple-cut sheets are discharged by a main conveyor at each of said levels. It will be understood, therefore, that the improved stock transferring means and the improved lateral stock take-off means of the present invention are operatively related to each level of the dual-level apparatus.

The present invention has as a still further object the provision of an auxiliary or secondary stock take-off apparatus adapted to be operatively related to the primary lateral stock take-off apparatus, whereby stacks of sheets may be removed from the primary take-off apparatus for more convenient handling thereof. The secondary take-off conveyor means travels in the same direction as the primary take-off conveyer at each level thereof, and is adapted to travel either at the speed of the primary conveyor or at a greater speed so that, especially in the case of closely adjacent evenly stacked piles of the multiple-cut sheets, each laterally delivered pile of sheets may be readily separated from a following pile.

With the above objects in view, the invention further resides in the combination and arrangement of parts and in the details of construction herein described and claimed; it being understood that the specific embodiments of the invention described herein are illustrative and that modifications thereof falling within the scope of the appended claims will be apparent to persons skilled in the art.

In the accompanying drawings:

Figure 1 is a side view of one embodiment of the present invention showing the primary and the secondary stock take-off apparatus of the present invention operatively associated with the delivery ends of the main discharge conveyors of a dual-level sheet cutting unit of an apparatus for fabricating corrugated board;

Figure 2 is an enlarged side view similar to Figure 1 without the secondary stock take-off, showing the forward ends of the main discharge conveyors, the stock transfer mechanism, the sheet arresting means and the primary stock take-off;

Figure 3 is a top plan view of the primary stock take-off apparatus of Figure 1 in conjunction with the adjacent end portions of the main discharge conveyor, the secondary stock take-off apparatus and a separate unitary auxiliary stock take-off apparatus;

Figure 4 is a sectional view showing a detail of the arrangement of the traveling belts and supporting table of the primary stock take-off apparatus as taken on line 4—4 of Figure 3;

Figure 5 is a sectional view through the primary and secondary stock take-off conveyors as taken on line 5—5 of Figure 1;

Figure 6 is an end view of Figure 1 as taken on line 6—6 thereof;

Figure 7 is a side view of one of the floating arms for maintaining the sheets in frictional contact with the delivery roll of the stock, this transfer mechanism, as taken on line 7—7 of Figure 3;

Figure 8 is a view similar to Figure 7 with a sheet of stock between the floating arm and the delivery roll aforesaid;

Figure 9 is a plan view of the floating arm and associated parts of Figure 8;

Figure 10 is a sectional view of the cross-head end of the floating arm as taken on line 10—10 of Figure 7;

Figure 11 is a sectional view of a detail showing the mounting of the floating arm as taken on line 11—11 of Figure 7;

Figure 12 is a sectional view through the sheet motion-arresting and guiding means as taken on line 12—12 of Figure 3;

Figure 13 is a sectional view of a detail showing the mounting of the sheet guiding means as taken on line 13—13 of Figure 12; and Figure 14 is a sectional view taken through the upper level of the primary stock take-off apparatus showing the backboard and associated means for arresting forward motion of the sheets and the means for positionally adjusting the same along the apparatus as taken on line 14—14 of Figure 2.

The present invention is designed for use in combination with the conventional apparatus for manufacturing paper board, which manufacture generally includes the feeding of continuous webs of sheet material, such as paper or cardboard, through various calendering and other sheet processing units arranged in line, to produce the finished product well known in the art. The final operation in such manufacture may be to transversely cut the fabricated web into lengths forming single-cut web-width sheets of predetermined length, this being effected by means of sheet cutting units, which usually consist of a pair of rotary cutter rolls arranged almost at the end of the line of the processing units, or it may be to cut the web into multiple-cut sheets each of less than web-width and all of the same predetermined length, this being effected by said rotary cutters and slotting means associated therewith, or it may also be to slot and score or impress printed matter upon pre-cut sheets. Upon completion of any of these operations, the sheets are discharged from the main apparatus by conveyor belts which conventionally deliver them to a point where the sheets may be taken up for disposition as desired.

In order to save space and increase production, the processing of the corrugated board is generally effected at two levels, all of the operations for each web being performed in each of the two levels. In such case, each level of the machine is provided with its own sheet cutting unit by means of which the fabricated web is severed into sheets of predetermined length. For the purposes of the present invention it is deemed unnecessary to illustrate the entire apparatus and consequently only the cutting unit thereof, designated generally by the reference numeral 20, is shown, it being understood that for the purposes of the present invention such cutting unit may also represent the entire machine employed in the manufacture of sheeted material, such as corrugated paper board or other sheet material, which is ultimately cut to sheets of desired size, or it may be replaced by some other type of unit, as for example, a sheet printing unit or a slotting and scoring unit.

While it is not necessary to describe the cutting unit 20 in detail, reference is made to the dual housings 21 and 22 of the rotary cutters and associated slitting means respectively disposed at different levels, and to the guide conveyors 23 and 24 and their operatively associated discharge conveyors 25 and 26, each of the latter supporting the free end of the continuous web while it is being severed and being adapted to convey the severed sheets away from the cutter units. The discharge conveyors 25 and 26 are respectively provided with forward shafts 27 and 28, upon each of which are journalled a series of laterally spaced pulleys 29 about which are fitted the endless belts 30 of the upper level conveyor 25 and the endless belts 31 of the lower level conveyor 26. The guide conveyors 23 and 24 are also respectively provided with forward shafts 32 and 33, each having journalled thereon a series of laterally spaced pulleys 34 about which are fitted the endless belts 35 of the upper level conveyor 23 and the endless belts 36 of the lower level conveyor 24.

The shafts 27 and 28 receive power respectively from the belts 30 and 31 which are driven in synchronism with the cutter units of the machine by conventional means which do not form part of the present invention. The shafts 32 and 33 at the fore ends of the guide conveyors receive power to drive the endless belts 35 and 36 trained over the pulleys 34 thereon from the shafts 27 and 28 respectively. To this end, a gear box 37 is suitably secured at the outer side end of the channeled upper-level frame member 38 which extends from the near side of the machine 20 (see Figures 1 and 2). Inside the gear box, located at the outer ends of the upper level conveyors 23 and 25, is a gear 39 fixed to an extension of the shaft 27 and a pair of suitably journalled intermediate gears 40 and 41 which form a gear train between the gear 39 and a gear 42 fixed to the shaft 32 also extending into the gear box, whereby shaft 32 is driven from shaft 27 in a direction opposite thereto. It will be understood that shaft 33 is driven from shaft 28 in a similar manner through a gear box (not shown) mounted upon the channeled lower-level frame member 43 on the far side of the machine. The upper-level frame of the machine 20 includes a pair of the longitudinally extending channel members 38—38, while the lower-level frame includes a corresponding pair of the channel members 43—43, the latter being floor-supported by suitable leg members 44—44 secured thereto. The upper and lower pairs of frame members are suitably interconnected and reinforced at their rear ends, while their forward ends are suitably secured to the main frame of the machine 20, as by struts 45—45 suitably supported upon said main machine frame and extending vertically between and secured to each side pair of frame members 38 and 43 on the outer side faces thereof, as is most clearly shown in Figure 2. The frame members are further reinforced at each of their two levels by rods 46—46 each extending between and secured to blocks 47—47 rigidly secured to the frame members 38—38 and 43—43 respectively.

Shafts 32 and 33 are rotatably supported at their opposite ends in suitable bearings provided in the forward ends of arms 48—48 at the upper level and in the forward ends of arms 49—49 at the lower level, these arms in turn being supported adjacent their forward ends by the transversely extending rods 46—46 and at their rear ends by vertically extending struts 50—50 suitably secured to the frame members 38—38 and 43—43. The ends of shafts 27 and 28 opposite to those which extend into the respective gear boxes 37—37 are rotatably supported in bearings suitably secured in any desired manner to the outer ends of the appropriate frame members 38 and 43.

It will be understood that each pair of rotary cutters of the cutter units is provided with mechanism well known in the art for adjusting the speed of rotation thereof for the purpose of varying the length of the sheet which is severed from the end of the continuous web.

In the customary use of the apparatus thus far described, the cut sheets are delivered from the cutter units 21 and 22 by the discharge conveyor belts 30 and 31 to receiving tables disposed immediately in front of the stock discharge conveyors 25 and 26. However, this rendered the handling and stacking of the cut sheets difficult, and to obviate this difficulty, the apparatuses of the said pending Apgar applications were developed to provide an arrangement by means of which the sheets, upon their discharge from the main conveyors 25 and 26, are delivered substantially at right angles to their original direction of travel, thus effecting a lateral discharge of the cut sheets. This lateral discharge is effected by the auxiliary stock take-off conveyors described in the said Apgar applications, the final lateral delivery of the sheets respectively received from the main discharge conveyors 25 and 26 being preferably in opposite directions relatively to each other. The lateral stock take-off apparatus of the present invention also effects lateral discharge for the sheets in opposite directions relatively to each other, such discharge being, however, effected more advantageously in the present instance by means of the several improvements hereinafter described in detail.

The upper level stock take-off conveyor 57, designed to cooperate with the upper level delivery conveyor 25 of the main apparatus, will be seen to be disposed at a level somewhat below the forward end of the conveyor 25. Similarly, the lower level stock take-off conveyor 58 will be seen to be disposed at a level below the forward end of the lower level main delivery conveyor 26. The stock take-off conveyors 57 and 58 are each mounted upon horizontally disposed frames suitably supported by the legs 59. Inasmuch as both of the conveyors 57 and 58 are substantially identical in construction, only the upper conveyor will be described in detail. The horizontally disposed frame of the upper level conveyor 57 includes a pair of outer longitudinally extending channel members 60—60 suitably interconnected at their opposite ends, the frame being provided at each corner thereof with a supporting leg 59. A second pair of longitudinally extending channel members 61—61 are respectively disposed inwardly of and in coplanar parallel relation to the channel members 60—60, these inner frame members 61—61 being also secured at their opposite ends to the supporting legs 59.

It will be observed that the forward pair of legs 59, adjacent the discharge end of the main conveyor, extend upwardly for some distance above the upper conveyor 57 and are interconnected at their upper ends by a cross member 62. The opposite or rear pair of legs 59, which do not extend above conveyor 57, are suitably interconnected by transverse members 67—67 extending between them. A pair of shafts 63—63 are respectively disposed longitudinally between each adjoining pair of the coplanar longitudinally extending channel members 60 and 61, the rear ends of these shafts 63 extending through the rear pair of the frame supporting legs 59. Suitable sets of bearing blocks fitted between the members 60 and 61 support the shafts 63 for rotation, while a series of longitudinally spaced pulleys 64 are fixed upon each of the shafts 63 for rotation therewith.

The channel members 61—61 support on their upper surface a table 65 which may be made of any suitable material, but preferably wood, this table being particularly designed for supporting the uppermost lengths of the endless conveyor belts 66 which are fitted about and actuated by the pulleys 64. In order to accommodate these uppermost lengths of the conveyor belts 66, the table is specially constructed as shown in Figure 4, which construction is identical with that shown in Figure 9 of pending application Serial No. 554,092 and fully described therein.

The conveyor belts 66 of the upper level take-off conveyor 57 all travel in the same direction to deliver sheets to one side of the stock take-off apparatus, while the conveyor belts 66 of the lower level conveyor 58 all travel in the opposite direction so as to deliver the sheets to the opposite side of the apparatus. It is preferred in the present invention that the power for driving these conveyor belts be derived from an independent source and not from the main stock delivery apparatus with which they are associated. In the preferred form, therefore, of the present invention the lateral stock take-off conveyors 57 and 58 are respectively independently driven by electric motors 68—68 suitably enclosed in housings 69—69. Through suitable reduction drives within these housings, the shafts 63 and the belts 66 associated therewith for each lateral take-off conveyor are driven in their proper directions, the speeds thereof being commonly regulated by adjusting the speed of motors 68—68 through a suitable rheostat unit 70 adapted to commonly and simultaneously control the operation of both of the motors 68—68.

Accordingly, it will be observed that the speed of the lateral stock take-off conveyors is independent of the speed of the main discharge conveyors inasmuch as a separate power source, the electric motors, drive these lateral take-off conveyors. As a consequence thereof, the speed of the lateral take-off conveyor belts may be increased or decreased as required either to cause single-cut sheets delivered thereto to be stacked in overlapped or "fanned" relation of any desired degree or to cause individual sheets of successive multiple-cut sheets to be evenly stacked one upon another for delivery from the conveyor in the form of a pile of several sheets. It is necessary to adjust the speed of the lateral take-off conveyor belts in certain timed relation to the forward motion of the sheets as they are transferred from the main delivery conveyor to achieve the stacked relationships above set forth. For example, when it is desired to arrange the multiple-cut sheets in the form of evenly stacked piles moving laterally of their original direction of travel, it is necessary to propel or deliver the sheets to the lateral stock take-off conveyor at a speed greater than that imparted to them by the main delivery conveyor alone, as will be clear from the following description.

As has been previously indicated, the multiple-cut web-width sheets each comprise a plurality of individual sheets of uniform length, each being of a width less than that of the web stock from which they are cut. Thus the web of stock may be cut longitudinally and transversely to provide succeeding groups each containing two to six or more individual sheets which together make up a so-called multiple-cut sheet, the sheets of each group being discharged simultaneously from the main delivery conveyor to and upon its associated lateral take-off conveyor. For most convenient handling of such multiple-cut sheets, it is desirable that they be discharged from the lateral take-off conveyor in the form of evenly stacked piles, each pile comprising as many individual sheets as are simultaneously delivered from the main delivery, these piles being formed, of course, as the sheets are being moved laterally by the stock take-off conveyor. In order that this may be effectively accomplished, the lateral conveyor belts must move the individual sheets thereon laterally a distance equal to the width of an individual sheet between deliveries thereon of successive groups of the individual sheets, and also the several groups of the individual sheets must be successively propelled from the main delivery conveyor to the lateral take-off conveyor at relatively high speeds in order to be fully received upon the lateral take-off conveyor exactly at the instant that a given group of the individual sheets are moved laterally to positions where they will completely underlie the next succeeding group of such sheets delivered forwardly from the main delivery.

For most explicit explanation, it may be assumed that the stock web is longitudinally as well as transversely cut to provide successive groups of sheets each such group containing three sheets arranged in side by side coplanar relation respectively designated sheet a, sheet b and sheet c. It also may be assumed that one such group of the individual sheets a, b and c has already been received by the lateral take-off conveyor and is being shifted laterally of its original direction of travel with sheet a of the group in the lead, and that a second group of the sheets is moving forwardly along the main delivery conveyor for discharge upon the lateral take-off conveyor. Under such conditions, the linear speed of the lateral take-off in relation to that of the main delivery must be such that sheets a and b of the second group when fully received on the lateral take-off will positionally register with sheets b and c of the laterally shifted first group of the sheets, with sheet c of the second group assuming the position originally occupied on the lateral take-off conveyor by sheet c of the first group. Overlapping between adjoining sheets would thus be avoided, and as the several groups of multiple-cut sheets are successively discharged upon the lateral stock take-off conveyor, an evenly stacked pile of three sheets would be formed in the position originally occupied by sheet a of the first group, which pile would be successively replaced by similarly formed succeeding piles of three sheets each. Had the stock web been cut to provide six sheets in each successively delivered group, then each pile successively delivered from the discharge side of the lateral take-off conveyor would include six sheets evenly stacked one upon the other. Obviously, the several piles of sheets moving across the lateral take-off will each contain a different number of sheets depending upon its position on the take-off conveyor, each pile initially containing but one sheet as it commences its lateral movement across the lateral take-off conveyor until finally it contains its maximum number of sheets at the discharge side of the conveyor, the maximum number being, of course, equal to the number of sheets in the group cut from the stock web as aforesaid.

In the specific example above set forth, so long as the stock is fed through the main machine there will continue to be formed upon the take-off conveyor, evenly stacked piles respectively comprising three sheets in the leading pile, two in the next adjoining pile and one in the last pile, with the result that piles of three sheets each will be successively discharged from the lateral conveyor. As previously indicated, in order to insure even stacking of the sheets one upon another in each pile thereof without any such interleaving between sheets of adjoining piles as would interfere with easy handling of each successively discharged pile, the linear speed of delivery of the multiple-cut sheets from the main delivery must be in proper relation to the linear speed of lateral movement of such sheets on the lateral take-off conveyor. The mechanism for obtaining this proper linear speed relationship essentially includes a so-called sheet transfer roll, one of which is operatively associated with each of the main delivery conveyors 25 and 26.

Thus, it will be understood that each level of the apparatus is provided with its own sheet transfer roll, and inasmuch as these means are substantially identical in construction, only that one which is operatively associated with the upper level main delivery conveyor of the apparatus will be described in detail. However, in order to identify the corresponding parts of the lower level transfer means, the same reference numerals are applied thereto as for the corresponding parts of the upper level transfer means.

Operatively associated with the upper level main delivery conveyor 25 and mounted in advance of the discharge end thereof is a sheet transfer roll 71 reduced in diameter at its opposite ends to form shafts 72—72 journalled for rotation in bearings suitably provided in the upwardly extending portions of the forward pair of the frame supporting legs 59—59. It will be noted that the roll 71 is so mounted in relation to the delivery conveyor 25 that the upper plane of the latter is substantially tangential to the upper edge of said roll 71, in consequence of which the sheets, as delivered from the said delivery conveyor, pass over and are supported by the roll 71, as shown clearly in Figures 7 and 8, wherein the stock is designated by the reference character S. In order to assist in the passing of the sheets over the roll 71, a series of forwardly projecting straps 73 of relatively narrow width are secured in any suitable manner to the discharge end of table 74 between the upper portions of the series of belts 30. These fixed straps 73, of the same thickness as belts 30, extend between the table 74 and the roll 71, terminating just short thereof where their free ends are supported on a transversely extending member 75, here shown as of angular cross-section, the latter being suitably secured at its opposite ends in the forward pair of the supporting legs 59—59. It will be observed that the upper planes of the straps 74 are also tangential to the upper edge of roll 71, in consequence of which the straps form a bridge over which the sheets S may pass from the discharge end of the main delivery conveyor to the roll 71.

The roll 71 is positively driven, in the case of the upper level sheet transferring mechanism, from the driven shaft 27 of the upper main delivery conveyor 25, while the corresponding roll 71 of the lower level sheet transferring mechanism is positively driven from the shaft 28 of the lower main delivery conveyor 26. An endless belt 76 passes over a suitable pulley fixed to an extended end 77 of shaft 27 opposite to gear box 37 and over a suitable pulley keyed to a shaft 78 extending from a variable drive unit 79 supported at the far end of the cross member 62. An endless belt 80 passes over a suitable pulley fixed to another shaft 81 extending from drive unit 79 and over a suitable pulley keyed to shaft extension 72 of the upper transfer roll 71. The upper level roll 71 is thus positively driven from the upper main delivery conveyor 25.

To drive the lower transfer roll 71, an endless belt 82 passes over a suitable pulley on the extended end of shaft 28 on the near side of the machine and over a suitable pulley on shaft 83 extending from one side of a second variable drive unit 84 supported on a leg 59 of the lateral conveyor frame. Other endless belts 85 and 86 pass respectively over suitable pulleys 87, 88, 89 and 90, the pulley 87 being keyed to a shaft 91 extending from the opposite side of the drive unit 84. Pulleys 88 and 89 act as speed reducers and are both keyed to a shaft 92 journalled for rotation in suitable bearings mounted in a supporting leg 59, the pulley 90 being keyed to a shaft extension 72 of the lower transfer roll 71. A suitable idler pulley 93 mounted on leg 59 presses against belt 86 to maintain it under proper driving tension.

In consequence of the above described driving means for the upper and lower level transfer rolls 71—71, it will be observed that the latter are positively driven from the main delivery conveyors through the intervention of the variable drive units 79 and 84. Accordingly, the transfer rolls 71—71 rotate in timed relation to the travel of the main discharge conveyor. By means of suitable adjustments of the said variable drive units, each of which may be of any conventional type, such as that known as a Reeves variable drive, the linear surface speed of the rolls 71—71, with which the sheets S are adapted to be in driven contact, may be adjusted by increasing or decreasing the rotary speed of said rolls so that it is less than, equal to, or greater than the linear speed of the main discharge conveyor belts at both levels of the apparatus, as may be required for differently cut sheets. For single-cut sheets of web width, the sheet transfer mechanism is usually adjusted so that the roll 71 thereof imparts to the sheets passing thereover a linear speed which is either less than or equal to the speed of the main discharge conveyor belts, as in the aforesaid Apgar applications. However, for multiple-cut like sheets, each of which is of less than web width, the transfer means is ordinarily adjusted so that the linear speed of the sheets discharged from the transfer roll 71 is in excess of the linear speed of the main delivery conveyor belts.

In order to maintain the sheets S in driven contact with each transfer roll 71, a series of floating arms 94 are provided, each having weighted free ends 95 disposed directly above roll 71. The weight of the floating arms 94 resting upon sheets S, when they are interposed between the roll 71 and the ends 95 of the arms as shown in Figure 8, is sufficient to maintain the sheets in driven contact with the roll 71, as a result of which the sheets S will have imparted to them the linear surface speed of the roll 71 regardless of the speed originally imparted to the sheets by the main delivery conveyors. It is to be noted, as seen in Figure 8, that the opposite ends of the sheets S during the travel thereof may be in contact simultaneously with both the main delivery conveyor belts and with its associated roll 71. The sheets S assume the linear surface speed of roll 71 even though they are partly in contact with the discharge conveyor belts because of the pressing action of arms 94 thereon and because there are no means, other than the weight of the sheets S, for keeping the sheets in driven contact with the conveyor belts, the sheets merely resting thereon and moving therewith until their speed is either increased or decreased by the roll 71.

Each of the arms 94 is preferably of general T-shape with the bar 96 at the free end 95 forming the cross member of the T. As seen in Figure 10, the bar 96 which is preferably circular in cross-section has a centrally disposed open transverse slot 97 formed therein in which the end of the arm is secured at right angles by any suitable means, such as screws 98—98, threaded into the bar 96. The cross bar 96, which may be integrally formed with the end of the arm 94, has roller members 99—99 rotating on pin bearings 100—100 at reduced opposite end portions thereof held in place by suitable non-rotatable washers 101—101. The said washers are held in place in contact with opposite end faces of bar 96 by suitable means such as screws 102—102 passing therethrough into threaded engagement with the bar 96, the washers being kept from rotation with the rollers 99—99 by means of pins 103—103 in operative engagement with the washers extending into suitable openings in opposite ends of the bar 96. To aid in guiding the sheets S between the rollers 99—99 of the cross bar 96 and the sheet transfer roll 71, a member 104, preferably in the form of flat leaf spring, extends from the underside of cross bar 96 to an undercut formed in the underside of arm 94 where it is secured by any suitable means, as by riveting, in such manner as to be flush with the arm at the point of attachment. The free end of said leaf spring member 104, in spring contact with bar 96 is so arranged as not to interfere with contact of the rollers 99—99 upon the stock passing between them and the transfer roll 71, the function of the leaf springs being to yieldingly guide the sheets S between the transfer roll 71 and the rollers 99—99 of the weighted arms 94.

The floating arms 94, each disposed above a strap 73 and between belts 35 of the upper guide conveyor 23, are respectively mounted at their rear ends 107 for limited rotation on a cross shaft 105 fixedly supported at its opposite ends in members 106—106, the latter being in turn fixedly supported on the reinforcing cross shaft 46. The rear end 107 of each arm 94 may be rotatably mounted on the shaft 105 by means of split ring members 108 and 109 which are adapted to be assembled upon the shaft 105 by means of suitable countersunk screws 110—110. To maintain the arms 94 in proper laterally spaced relation on the shaft 105, each of said arms is confined between a pair of collars 111—111 respectively provided with arcuate shaped slots 112—112 extending therethrough, the collars being secured to the shaft 105 on each side of the arms 94 by any suitable means, as by set screws 113—113, as clearly appears in Figure 11. With the collars 111—111 so secured on the shaft 105, the arcuate slots 112—112 are in position to receive pins 114—114 projecting from opposite sides of the split ring 109 of the arm 94. The pins 114—114, preferably comprising the opposite ends of a rod 115 secured by set screw 116 in a suitable opening through split ring 109, coact with the arcuate slots 112—112 to limit the permissible swinging movement of the arms 94 about their shaft 105.

The present invention provides improved means for arresting the forward motion of the sheets in either single or multiple-cut form as the same are deposited on the lateral conveyors with forward motion imparted by the sheet transferring roll 71. The motion arresting or stop means for the sheets also function to positionally adjust the sheets on the lateral stock take-off conveyors so that the same may be properly delivered at a receiving station. Because the size of the sheets may vary over a considerable range, the present invention provides for the longitudinal adjustment of the said arresting means.

The longitudinal channel members 60—60 of the lateral take-off conveyor supporting frame each have fixed to their lower edges a toothed rack bar 117 (Figure 2), these rack bars being engaged by a pair of pinions 118 which are respectively secured to the opposite ends of a common shaft 119 extending transversely of the lateral take-off conveyor frame. The shaft 119 is supported for rotation in depending ends of members 120—120 suitably disposed on channel members 60—60 for sliding movement along the same. Opposite ends of a back-stop member 121 are secured to the forward edges of the members 120—120. A hand wheel 122, suitably fixed upon a stub shaft 123 journalled upon one of the members 120—120 provides for adjustment of the back-stop member 121 longitudinally of the lateral take-off conveyor, the hand wheel being suitably connected to the shaft 119 by a sprocket chain 124 passing over sprocket wheels respectively keyed to the hand-wheel stub shaft 123 and the pinion shaft 119.

As most clearly appears in Figures 2, 3 and 12, the back stop 121 which just clears table 65 is provided with several elements which serve to engage the forward edge portion of each sheet as it is propelled under them by the roll 71 and deposited on the lateral conveyor in contact with said back stop 121. These elements of suitable number uniformly spaced in a line extending transversely across the original direction of travel of the sheets, each comprise a weighted ball 125 of any suitable material mounted for universal rotation within circular openings 126 of a retaining member 127. This retaining member 127 is supported parallel to table 65 in an elevated plane approximately passing through the center of balls 125 resting upon the table 65 by brackets 128—128 secured to opposite ends of member 127 and slidably supported upon the upper edge of the back board 121, to thus maintain the balls so that one or more sheets may be positioned thereunder as they are propelled forwardly by the roll 71 to ride under the balls and come to rest against back-stop 121. The universally rotatable balls 125 maintain the sheets in this arrested position, rising within the openings 126 as more sheets are placed thereunder while at the same time permitting the sheets to move laterally on the stock take-off conveyor. By slidably mounting the hooked upper ends of the brackets 128—128 upon the back-board 121, the ball-retaining member 127 may be shifted laterally of the table 65 so as to adjustably position the balls 125 as a group laterally of the direction of feed of the sheets forwardly from the roll 71. The number and spacing of the balls 125 within their retaining member 127 may be varied as desired to impose greater or less holding pressure on different portions of the leading ends of the sheets as may be required to maintain said leading ends parallel to the back-board 121.

In the absence of any sheet being interposed between the lateral take-off conveyor belts 66 and the balls 125, the latter will be in position as shown in Figure 2. As a sheet is propelled forwardly by the roll 71, the forward edge of the balls, the sheet engages the under surface of the balls, the ensuing wedging action pushing them upward to the position of Figure 12. This serves to absorb some of the energy of the sheet forward motion with the consequence that when the sheets strike the back-board 121, with the balls resting thereon, there is no rebound. As more sheets come to rest at the back-board, forming stacks, the balls rise further within openings 126 and maintain the sheets in stacked form as they move laterally for discharge from the conveyor.

To insure that warped sheets, which may occasionally come off the main machine 20, be directed under the balls 125, an angled deflector board 129 extending transversely in front of the balls is provided against which such sheets may strike and be guided to proper position for arrest by the back-board. As best seen in Figures 12 and 13, the board 129, rectangular in shape, has an angle shaped member 130 fixed to the same along its longitudinal median line. A shaft 131 fixed to angle member 129 has its opposite ends journalled for rotary movement in blocks 132—132 mounted upon the forward ends of angle members 133—133 supported at their rear ends on the upper edge of members 120—120. By turning hand wheel 134 secured to one end of shaft 131 the angle of deflector board 129 may be adjusted, and it may be held in such adjusted position by suitably turning set screw 135 threaded in block 132 into locking engagement with shaft 131.

In the operation of the sheet motion arresting means above described it will be apparent that the back-board 121, the balls 125 and the guide board 129, all adapted to act upon the sheets in their forward motion, may be positionally adjusted as a unit along the lateral conveyor by operation of hand wheel 122. As different size single-cut sheets or different size multiple-cut sheets come from the main discharge conveyor, it is a simple matter to add or take away balls 125 as required so that the sheets will come to rest in proper stacked relation in front of the back board and will move laterally to the discharge station with the front and rear edges of the sheets parallel to the back board.

When individual sheets are stacked in registry on the conveyor in front of the back board 121, the adjacent stacks are quite close together since the multiple-cut sheets delivered to the conveyor have the individual sheets thereof close together, being separated from each other only by the slits formed by the cutter units 21 and 22 of the main machine. It sometimes happens, even though the lateral speed of the take-off conveyor is properly related to the forward speed of the multiple-cut sheets as delivered by roll 71 to form individual piles of evenly stacked sheets, that edge portions of sheets in adjacent stacks may be accidentally overlapped. It is difficult to handle the individual stacks of sheets when they are close together, more so when some of the sheets are overlapped and accordingly, the present invention additionally provides means comprising a secondary stock take-off conveyor operatively related to the previously described primary lateral stock take-off conveyor for taking the piles successively therefrom and separating them from each other for more convenient handling at a station where the stacks may be manually removed or otherwise handled. It is desirable that the operating speed of the secondary take-off conveyor be capable of adjustment to a speed greater than that of the primary take-off conveyor so that as each pile of sheets is received by the secondary take-off, it is automatically separated from a following pile of sheets. However, when single-cut sheets are being fabricated and stacked in overlapped relation on the primary conveyor, the secondary conveyor may continue to operate at the higher speed or it may be adjusted to operate at the same speed as the primary conveyor. If operated at the higher speed, the secondary conveyor will pull the successive bottom sheets out a certain distance from under the stack of overlapped or "fanned" sheets, while if operated at the same speed it will simply continue the lateral movement of the overlapped stacks to the discharge station without disturbing the fanned relation of the sheets.

The secondary stock take-off conveyors, respectively designated by the reference numerals 136 and 137, are operatively associated with the upper and lower level primary take-off conveyors 57 and 58 as clearly appears in Figure 5. Inasmuch as the secondary conveyors 136 and 137 are essentially of the same construction, even though of different size and location, a description of one will suffice for both, the like parts of each being identified by the same reference characters. The conveyor 136 is provided with horizontally traveling belts in line with the belts of the upper level primary conveyor 57, whereas conveyor 137 is provided with traveling belts at an angle to the horizontal extending upwardly from the belts of the lower level primary conveyor 58. The direction of travel of the conveyor belts of each secondary take-off is the same as that of the belts of its associated primary take-off.

Adjacent to the primary stock take-off conveyor at each side thereof each secondary conveyor 136 and 137 has spaced parallel side frame channel members 138—138 suitably joined to end frame members 139—139. To support the secondary conveyor frames at the required levels, legs 140—140 are provided under each end frame member 139—139. A pair of shafts 141—141 are respectively disposed parallel to and spaced from the outside of side frame members 138—138, the opposite ends of these shafts being supported for rotation in suitable bearings 142—142 fixed to the ends of frame members 138—138. A series of longitudinally spaced pulleys 143 carried by each of the shafts 141 are adapted to drive endless conveyor belts 144 which are fitted about the pulleys. One of the shafts 141, adjacent the primary conveyor, extends beyond bearing 142, as at 145, into operative relationship with the drive means within motor housing unit 69 whereby the chain 146 drives the shaft 141 by means of a suitable gear on the latter (see Figure 6). Interposed between the drive means in the housing 69 and the shaft 141, at any convenient place, is a conventional variable speed change mechanism 147 by means of which the speed of shaft 141 may be readily changed so that the secondary conveyor belts 144 may travel either at the speed of primary conveyor belts 66 or at such increased speed as may be desired by the operator of the apparatus.

As shown in Figures 3 and 6, there is also provided a unitary self-powered conveyor table 148 mounted upon trucks 149 whereby the same may be readily moved and placed wherever an auxiliary conveyor is desired, here for instance in association with secondary conveyor 136. The endless belts 150 are power driven in the direction of the arrows by electric motor 151 through suitable chain and gear connections and a variable speed drive 152 whereby the speed of the belts 150 may be adjusted as required for a particular use of the conveyor table, e. g., as when it is desired to adjust the speed of belts 150 to that of belts 144 on the secondary conveyor 136 in order that the stock may be readily transferred from one conveyor to the other at a uniform speed.

It will be understood that the present invention is susceptible of various changes and modifications which may be made from time to time without departing from the general principles or real spirit thereof, and it is, accordingly, intended to claim the said invention broadly, as well as specifically, as indicated in the appended claims.

What is claimed as new and useful is:

1. In an apparatus for handling and distributing stock delivered in the form of successive sheets of predetermined length and width from a main fabricating apparatus having a main delivery conveyor, a primary stock take-off conveyor associated with and traveling in a direction transverse to the direction of travel of the main conveyor, a secondary stock take-off conveyor associated with and traveling in the same direction as the primary conveyor, and means for successively transferring the sheets from the main conveyor to the primary conveyor, said transfer means being operative to impart to the sheets successively delivered to the primary conveyor a delivery speed exceeding the surface speed of the main conveyor, said primary conveyor being operative to impart to the sheets a speed such that they will travel a distance equal to the width of a sheet between successive sheet deliveries and said secondary conveyor being operative to impart to the sheets a speed equal to at least twice their speed on the primary conveyor said conveyors being all of the continuously operating type.

2. In an apparatus for handling and distributing stock delivered in the form of successive groups of a plural number of sheets of the same predetermined length and width from a main fabricating apparatus having a main delivery conveyor, a primary stock take-off conveyor associated with and traveling in a direction transverse to the direction of travel of the main delivery conveyor, a secondary stock take-off conveyor associated with and traveling the same direction as the primary conveyor, and means for successively transferring groups of sheets simultaneously from the main conveyor to the primary conveyor, said transfer means being operative to impart to the groups of sheets successively delivered to the primary conveyor a delivery speed exceeding the surface speed of the main conveyor, said primary conveyor being operative to impart to the sheets a speed such that they will travel a distance equal to the width of a sheet between successive group deliveries so that said sheets will be distributed in even stacks equal in number to said plural number as said primary conveyor continues to travel whereby stacks of sheets will move toward said secondary conveyor, and said secondary conveyor being operative to travel at such a speed as will successively remove stacks of sheets from said primary conveyor, each of said stacks so removed comprising a number of sheets equal in number to said plural number said conveyors being all of the continuously operating type.

3. In an apparatus for handling and distributing stock in sheet form cut to predetermined length and width including a main delivery conveyor, a stock take-off conveyor associated with and traveling in a direction transverse to the direction of the main conveyor, and means for successively transferring the sheets from the main to the take-off conveyor, said transfer means being operative to impart to the sheets successively delivered to the take-off conveyor a delivery speed exceeding the surface speed of the main conveyor, said take-off conveyor being operative to impart to the sheets a speed such that they will travel a distance at least equal to the width of a sheet between successive sheet deliveries, and said conveyors being all of the continuously operating type.

4. In an apparatus for handling and distributing stock delivered in the the form of successive groups of a plural number of sheets of the same predetermined length and width from a main fabricating apparatus having a main delivery conveyor, a stock take-off conveyor associated with and traveling in a direction transverse to the direction of travel of the main conveyor, and means for successively transferring groups of sheets simultaneously from the main to the take-off conveyor, said transfer means being operative to impart to the groups of sheets successively delivered to the take-off conveyor a delivery speed exceeding the surface speed of the main conveyor, said take-off conveyor being operative to impart to the sheets a speed such that they will travel a distance equal to the width of a sheet between successive group deliveries so that said sheets will be distributed in even stacks equal in number to said plural number as said take-off conveyor continues to travel, each of said stacks when removed from said take-off conveyor comprising a number of sheets equal in number to said plural number, and said conveyors being all of the continuously operating type.

References Cited in the file of this patent

UNITED STATES PATENTS

| Number | Name | Date |
|---|---|---|
| 1,148,509 | Gammeter | Aug. 3, 1915 |
| 1,272,847 | Pertz | July 16, 1918 |
| 1,302,571 | McAdams | May 6, 1919 |
| 1,600,022 | Van Heek | Sept. 14, 1926 |
| 1,680,044 | Hitchcock | Aug. 7, 1928 |
| 1,882,895 | Rader | Oct. 18, 1932 |
| 1,913,533 | Brunner | June 13, 1933 |
| 1,939,360 | Nelson | Dec. 12, 1933 |
| 1,963,183 | Walker | June 19, 1934 |
| 1,967,545 | Sullivan | July 24, 1934 |
| 1,987,339 | Hitchcock | Jan. 8, 1935 |
| 2,101,328 | Broadmeyer | Dec. 7, 1937 |
| 2,328,859 | Taylor | Sept. 7, 1943 |
| 2,496,438 | Brandt | Feb. 7, 1950 |